US012633465B2

(12) United States Patent
Kim et al.

(10) Patent No.: US 12,633,465 B2
(45) Date of Patent: May 19, 2026

(54) MULTILAYER ELECTRONIC COMPONENT

(71) Applicant: SAMSUNG ELECTRO-MECHANICS CO., LTD., Suwon-si (KR)

(72) Inventors: Kyung Sik Kim, Suwon-si (KR); Seung In Baik, Suwon-si (KR); Jong Hwan Lee, Suwon-si (KR); Min Young Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 265 days.

(21) Appl. No.: 18/143,728

(22) Filed: May 5, 2023

(65) Prior Publication Data

US 2024/0212937 A1     Jun. 27, 2024

(30) Foreign Application Priority Data

Dec. 23, 2022     (KR) ........................ 10-2022-0182444

(51) Int. Cl.
*H01G 4/232*        (2006.01)
*H01G 4/248*        (2006.01)
*H01G 4/30*         (2006.01)

(52) U.S. Cl.
CPC ........... *H01G 4/2325* (2013.01); *H01G 4/248* (2013.01); *H01G 4/30* (2013.01)

(58) Field of Classification Search
CPC ........ H01G 4/2325; H01G 4/248; H01G 4/30; H01G 4/12; H01G 4/1227; H10G 4/012

(Continued)

(56) References Cited

U.S. PATENT DOCUMENTS

2008/0144253 A1*  6/2008  Togashi ................. H01G 4/232
                                                          361/301.4
2009/0191418 A1*  7/2009  Nakano .................. H01C 7/102
                                                          428/469

(Continued)

FOREIGN PATENT DOCUMENTS

JP        2021-68733 A      4/2021
JP        6976053 B2       11/2021

(Continued)

OTHER PUBLICATIONS

Amador C. Caballero et al., "Grain Growth Control and Dopant Distribution in ZnO-Doped BaTiO3", J. Am. Ceram. Soc., 81 [4] 939 44 (1998).

(Continued)

*Primary Examiner* — Arun Ramaswamy
(74) *Attorney, Agent, or Firm* — MORGAN, LEWIS & BOCKIUS LLP

(57)        ABSTRACT

A multilayer electronic component includes a body including a dielectric layer and first and second internal electrodes alternately disposed in a first direction with the dielectric layer interposed therebetween, and having first and second surfaces in the first direction, third and fourth surfaces in a second direction, and fifth and sixth surfaces in a third direction; side margin portions disposed on the fifth and sixth surfaces; and external electrodes disposed on the third and fourth surfaces. Side margin portions includes $BaTiO_3$, Zn, and Zr, an amount of Zn and an amount of Zr in the side margin portions are 0.5 mol or more and 1.0 mol or less, relative to 100 mol of Ti included in the side margin portions. The amount of Zn and the amount of Zr in the side margin portions are different from an amount of Zn and an amount of Zr in the dielectric layer.

15 Claims, 9 Drawing Sheets

(58) Field of Classification Search
USPC .... 361/301.4, 306.3, 321.1, 321.4, 311, 312, 361/321.5
See application file for complete search history.

(56) References Cited

U.S. PATENT DOCUMENTS

| | | | | |
|---|---|---|---|---|
| 2010/0165541 | A1* | 7/2010 | Sasabayashi | H01B 3/12 |
| | | | | 361/313 |
| 2013/0119827 | A1 | 5/2013 | Kang et al. | |
| 2014/0301013 | A1* | 10/2014 | Kim | H01G 4/01 |
| | | | | 29/25.03 |
| 2016/0024346 | A1* | 1/2016 | Inoue | H01G 4/224 |
| | | | | 336/200 |
| 2017/0110246 | A1 | 4/2017 | Symes, Jr. et al. | |
| 2018/0166219 | A1 | 6/2018 | Noda et al. | |
| 2019/0115153 | A1* | 4/2019 | Park | H01G 4/224 |
| 2019/0180936 | A1* | 6/2019 | Cha | C04B 35/47 |
| 2020/0126721 | A1* | 4/2020 | Fukunaga | H01G 4/012 |
| 2021/0020375 | A1* | 1/2021 | Park | H01G 4/2325 |
| 2021/0118617 | A1 | 4/2021 | Morita | |
| 2022/0181082 | A1 | 6/2022 | Ham | |
| 2023/0207202 | A1* | 6/2023 | Kim | H01G 4/1227 |
| | | | | 361/301.4 |

FOREIGN PATENT DOCUMENTS

| | | | |
|---|---|---|---|
| KR | 10-2020-0095443 | A | 8/2020 |
| KR | 10-2022-0081633 | A | 6/2022 |
| WO | 2016/007255 | A1 | 1/2016 |

OTHER PUBLICATIONS

Timothy R. Armstrong et al., "Effects of Zirconia on Microstructure and Dielectric Properties of Barium Titanate Ceramics", J. Am. Ceram. Soc., 72 [4] 605-11 (1989).

E.R. Segnit et al., "The Ternary System BaO—ZnO—SiO2", Australian Journal of Chemistry 23(6) 1077-1085 (1970).

Extended European Search Report issued in corresponding European Patent Application No. 23171345.4 dated Nov. 14, 2024.

\* cited by examiner

FIRST
DIRECTION

SECOND
DIRECTION

THIRD
DIRECTION

FIRST
DIRECTION

SECOND
DIRECTION

I-I'

II–II'

141b    141a

K1

111b     111a

K2

MULTILAYER ELECTRONIC COMPONENT

CROSS-REFERENCE TO RELATED APPLICATION (S)

This application claims benefit of priority to Korean Patent Application No. 10-2022-0182444 filed on Dec. 23, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip-type condenser mounted on the printed circuit boards of any of various electronic products, such as an image display device, including a liquid crystal display (LCD) or a plasma display panel (PDP), a computer, a smartphone, or a mobile phone, serving to charge or discharge electricity therein or therefrom.

The multilayer ceramic capacitor has a small size, implements high capacitance, and is easily mounted, and may thus be used as a component of various electronic devices. There has been increasing demand for a multilayer ceramic capacitor to have a reduced size and higher capacitance as each of various electronic devices such as a computer, a mobile device, and the like have a reduced size and higher output.

A multilayer ceramic capacitor may generally include a body in which a dielectric layer and an internal electrode are alternately disposed, and a side margin portion disposed on a side surface of the body to protect the body.

Meanwhile, recently, in order to achieve a reduced size and higher capacitance of a multilayer ceramic capacitor, a dielectric layer and an internal electrode are being thinned. As a thickness of the dielectric layer becomes thinner, the dielectric layer becomes vulnerable to deterioration of insulation resistance, and accordingly, a breakdown in withstand voltage of the multilayer ceramic capacitor destruction may occur.

Since such a breakdown in withstand voltage tends to occur at an end of the side margin portion, a new method for securing reliability of the multilayer ceramic capacitor by changing a material added to the side margin portion, or a structure, compared to the dielectric layer of the multilayer ceramic capacitor, is needed.

SUMMARY

An aspect of the present disclosure is to improve reliability of a multilayer electronic component.

An aspect of the present disclosure is to reduce a dissipation factor (DF) and an effective capacitance change rate of a multilayer electronic component.

However, the object of the present disclosure is not limited to the above, and will be more easily understood in the process of describing specific embodiments of the present disclosure.

According to an aspect of the present disclosure, a multilayer electronic component includes a body including a dielectric layer and first and second internal electrodes alternately disposed in a first direction with the dielectric layer interposed therebetween, and having first and second surfaces opposing each other in the first direction, third and fourth surfaces opposing each other in a second direction and connected to the first and second surfaces, and fifth and sixth surfaces opposing each other in a third direction and connected to the first to fourth surfaces; side margin portions disposed on the fifth and sixth surfaces; and external electrodes disposed on the third and fourth surfaces, wherein at least of one the side margin portions includes $BaTiO_3$, Zn, and Zr, an amount of Zn and an amount of Zr in the at least of one the side margin portions are 0.5 mol or more and 1.0 mol or less, relative to 100 mol of Ti included in the at least of one the side margin portions, respectively, and the amount of Zn in the at least of one the side margin portions is different from an amount of Zn in the dielectric layer, and the amount of Zr in the at least of one the side margin portions is different from an amount of Zr in the dielectric layer.

According to an aspect of the present disclosure, a multilayer electronic component includes a body including a dielectric layer and first and second internal electrodes alternately disposed in a first direction with the dielectric layer interposed therebetween, and having first and second surfaces opposing each other in the first direction, third and fourth surfaces opposing each other in a second direction and connected to the first and second surfaces, and fifth and sixth surfaces opposing each other in a third direction and connected to the first to fourth surfaces; side margin portions disposed on the fifth and sixth surfaces; and external electrodes disposed on the third and fourth surfaces, wherein at least one of the side margin portions includes $BaTiO_3$, Zn, and Zr, an amount of Zn in the at least one of the side margin portions is more than an amount of Zn in the dielectric layer, and an amount of Zr in the at least one of the side margin portions is more than an amount of Zr in the dielectric layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
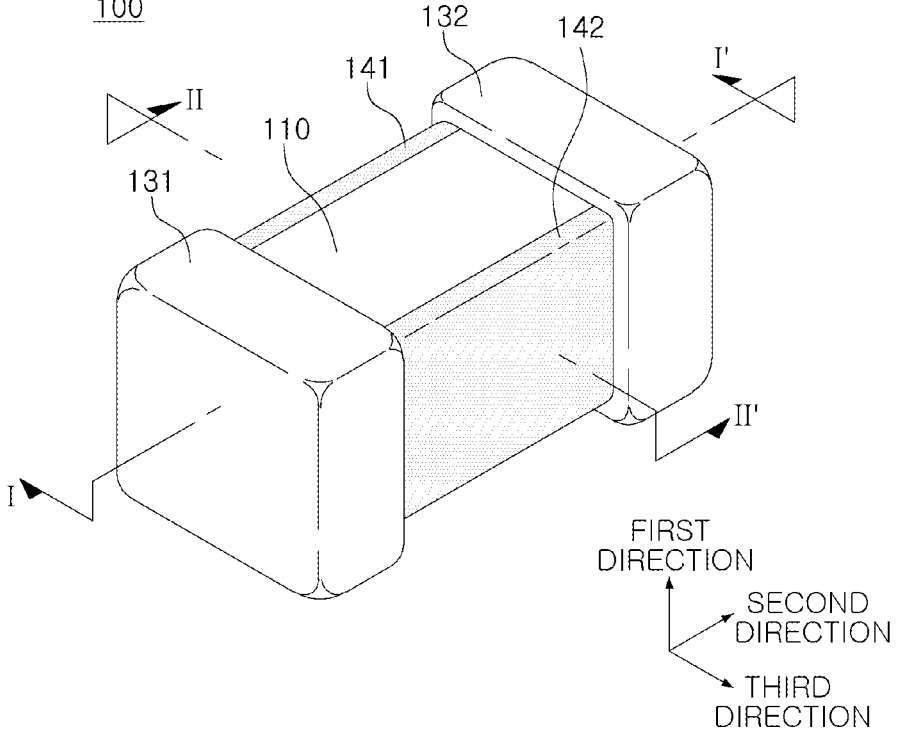
FIG. 1 is a perspective view schematically illustrating a multilayer electronic component according to an embodiment of the present disclosure.

Hereinafter, embodiments of the present disclosure will be described with reference to specific example embodiments and the attached drawings. The embodiments of the present disclosure may, however, be exemplified in many different forms and should not be construed as being limited to the specific embodiments set forth herein. The example embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

FIG. 1 is a perspective view schematically illustrating a multilayer electronic component according to an embodiment of the present disclosure.

Figure 2:
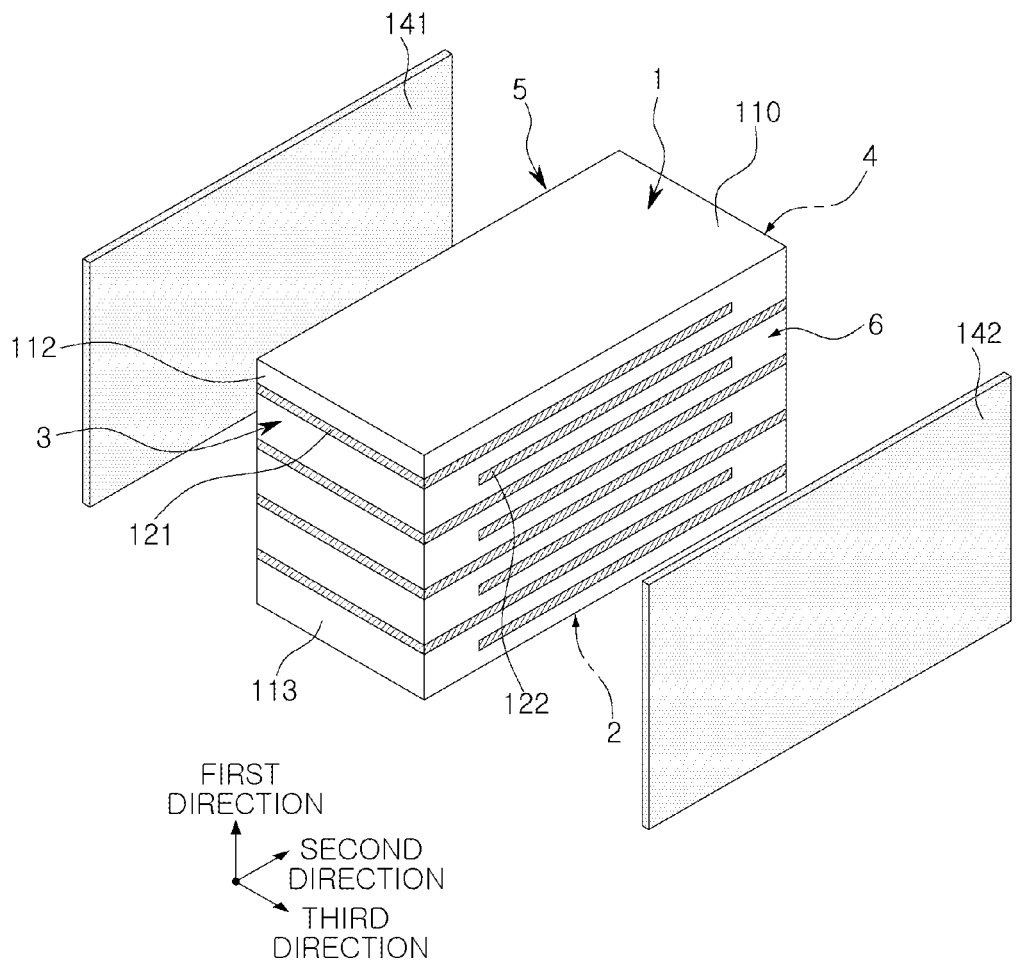
FIG. 2 is an exploded perspective view schematically illustrating the body and the side margin portion as shown in FIG. 1.

FIG. 2 is an exploded perspective view schematically illustrating the body and the side margin portion of FIG. 1.

Figure 3:
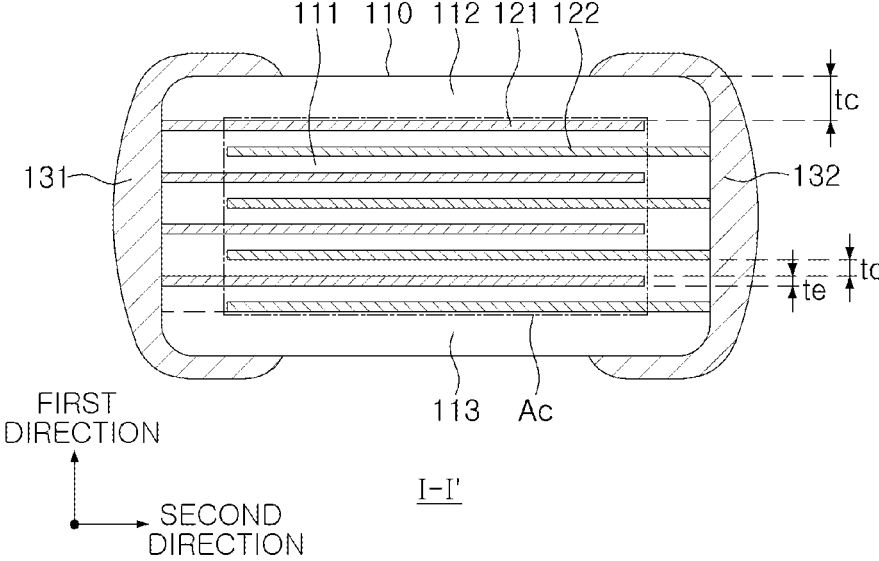
FIG. 3 is a cross-sectional view taken along line I-I' and schematically illustrating the embodiment of FIG. 1.

FIG. 3 is a cross-sectional view schematically illustrating FIG. 1, taken along line I-I'.

Figure 4:
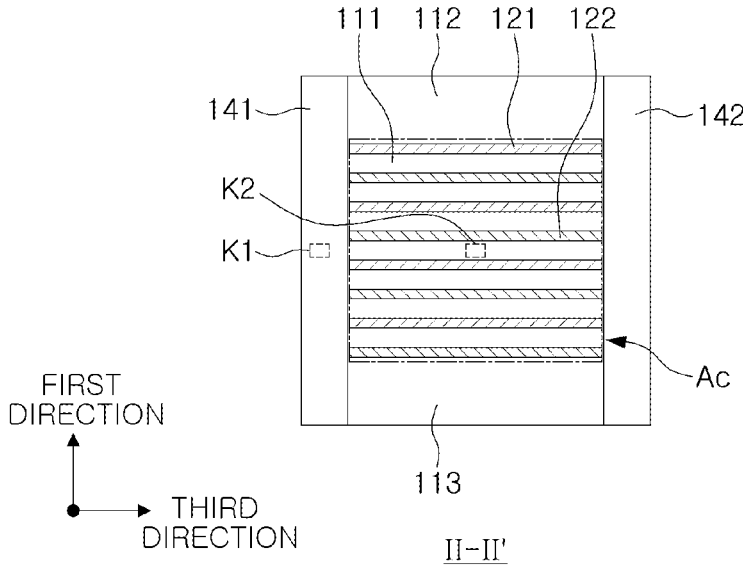
FIG. 4 is a cross-sectional view taken along line II-II' and schematically illustrating the embodiment of FIG. 1.

FIG. 4 is a cross-sectional view schematically illustrating FIG. 1, taken along line II-II'.

Figure 5:
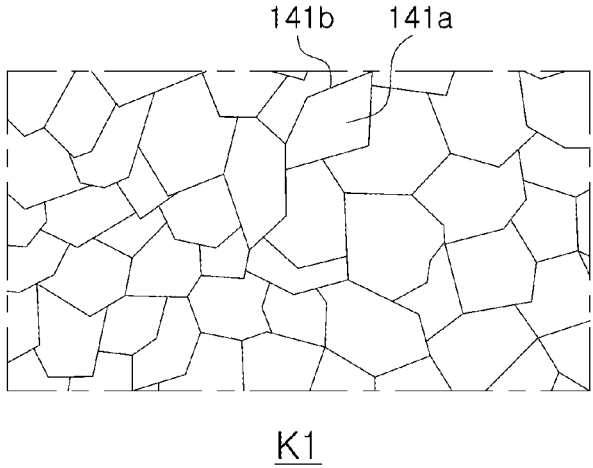
FIG. 5 is an enlarged view of region K1 as shown in FIG. 4.

FIG. 5 is an enlarged view of region K1 of FIG. 4.

Figure 6:
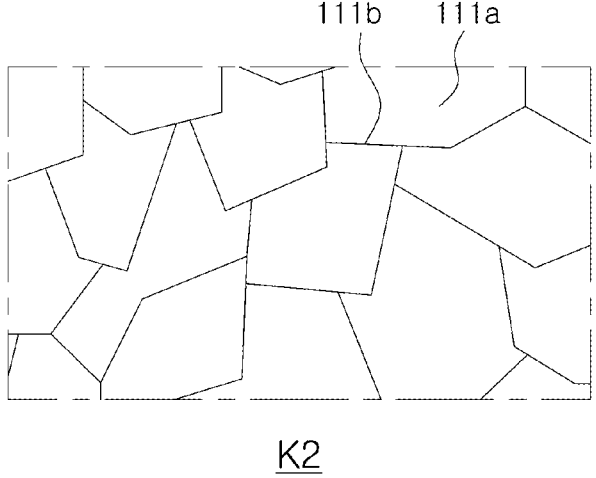
FIG. 6 is an enlarged view of region K2 as shown in FIG. 4.

FIG. 6 is an enlarged view of region K2 of FIG. 4.

Referring to FIGS. 1 to 6, a multilayer electronic component 100 according to an embodiment of the present disclosure may include a body 110 including a dielectric layer 111 and first and second internal electrodes 121 and 122 alternately disposed in a first direction with the dielectric layer interposed therebetween, and having first and second surfaces 1 and 2 opposing in the first direction, third and fourth surfaces 3 and 4 connected to the first and second surfaces and opposing in a second direction, and fifth and sixth surfaces 5 and 6 connected to the first to fourth surfaces and opposing in a third direction; side margin portions 141 and 142 disposed on the fifth and sixth surfaces; and external electrodes 131 and 132 disposed on the third and fourth surfaces, wherein at least of one the side margin portions includes $BaTiO_3$, Zn, and Zr, an amount of Zn and an amount of Zr in at least of one the side margin portions are 0.5 mol or more and 1.0 mol or less, relative to 100 mol of Ti included in at least of one the side margin portions, respectively, and the amount of Zn in at least of one the side margin portions is different from an amount of Zn in the dielectric layer, and the amount of Zr in at least of one the side margin portions is different from an amount of Zr in the dielectric layer.

According to an embodiment of the present disclosure, the amount of Zn and the amount of Zr in at least of one the side margin portions 141 and 142 may be 0.5 mol or more and 1.0 mol or less, relative to 100 mol of Ti included in at least of one the side margin portions 141 and 142, respectively, to suppress grain growth of a dielectric grain and induce densification thereof in at least of one the side margin portions 141 and 142, to improve reliability of the multilayer electronic component, and to reduce a dissipation factor (DF) and an effective capacitance change rate under a DC electric field.

Hereinafter, each component included in the multilayer electronic component 100 according to an embodiment of the present disclosure will be described in more detail.

Although the detailed shape of the body 110 is not particularly limited, as illustrated, the body 110 may have a hexahedral shape or a shape similar thereto. Due to shrinkage of ceramic powder particles included in the body 110 or polishing of corners during a sintering process, the body 110 may not have a hexahedral shape with perfect straight lines, but may substantially have a hexahedral shape.

The body 110 may have the first and second surfaces 1 and 2 opposing in the first direction, the third and fourth surfaces 3 and 4 connected to the first and second surfaces 1 and 2 and opposing in the second direction, and the fifth and sixth surfaces 5 and 6 connected to the first to fourth surfaces 1, 2, 3 and 4 and opposing in the third direction.

In the body 110, the dielectric layer 111 and internal electrodes 121 and 122 may be alternately stacked. A plurality of dielectric layers 111 forming the body 110 may be in a sintered state, and a boundary between adjacent dielectric layers 111 may be integrated to the extent that it is difficult to confirm without using a scanning electron microscope (SEM).

The dielectric layer 111 may include a plurality of dielectric grains 111a and grain boundaries 111b disposed between adjacent dielectric grains. The material constituting the dielectric layer 111 is not particularly limited as long as sufficient capacitance is obtained, and may include, for example, barium titanate ($BaTiO_3$).

The dielectric layer 111 may be formed by preparing a ceramic slurry containing ceramic powder such as barium titanate ($BaTiO_3$) or the like, an organic solvent and a binder, coating and drying the slurry on a carrier film to prepare a ceramic green sheet, and then sintering the ceramic green sheet.

An average thickness td of the dielectric layer 111 does not need to be particularly limited. In general, as a thickness of the dielectric layer 111 decreases, there may be a problem in that moisture resistance reliability and high temperature reliability of the multilayer electronic component deteriorate. In a multilayer electronic component according to an embodiment of the present disclosure, an amount of Zn and an amount of Zr in at least of one the side margin portions 141 and 142 satisfy 0.5 mol or more and 1.0 mol or less, relative to 100 mol of Ti included in at least of one the side margin portions, respectively. Therefore, even when the average thickness td of the dielectric layer 111 is 0.4 μm or less, reliability of the multilayer electronic component may be secured.

In this case, the average thickness td of the dielectric layer 111 means a size of the dielectric layer 111 disposed between the internal electrodes 121 and 122 in the first direction. The average thickness of the dielectric layer 111 may be measured by scanning a plane of the body 110 in the first and second directions with a scanning electron microscope (SEM) at a magnification of 10,000. More specifically, the average thickness of the dielectric layer may be acquired by measuring thicknesses at a plurality of points of a dielectric layer 111, for example, at thirty points being located at equal intervals in the second direction. The thirty points located at equal intervals may be determined on a capacitance formation portion Ac to be described later. In addition, in a case in which the measurement of an average value is executed with respect to 10 dielectric layers, the average thickness of the dielectric layers 111 may be more generalized. Other methods and/or tools appreciated by one of ordinary skill in the art, even if not described in the present disclosure, may also be used.

The internal electrodes 121 and 122 may be alternately disposed, together with the dielectric layer 111. For example, a first t internal electrode 121 and a second internal electrode 122, which may be a pair of electrodes having different polarities, may be arranged to oppose each other, with the dielectric layer 111 interposed therebetween. The first internal electrode 121 and the second internal electrode 122 may be electrically separated from each other by the dielectric layer 111 disposed therebetween.

The first internal electrode 121 may be connected to the third, fifth, and sixth surfaces, and the second internal electrode 122 may be connected to the fourth, fifth, and sixth surfaces. Also, the first internal electrode 121 may be disposed to be spaced apart from the fourth surface, and the second internal electrode 122 may be disposed to be separated from the third surface.

A conductive metal included in the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The internal electrodes 121 and 122 may be formed by applying a conductive paste for internal electrodes containing a conductive metal by a predetermined thickness on a ceramic green sheet, and sintering the same. As a method of printing the conductive paste for internal electrodes, a screen printing method, a gravure printing method, or the like may be used, but the present disclosure is not limited thereto.

Average thicknesses te of the internal electrodes 121 and 122 do not need to be particularly limited. In a multilayer electronic component according to an embodiment of the present disclosure, an amount of Zn and an amount of Zr in at least one of the side margin portions 141 and 142 satisfy 0.5 mol or more and 1.0 mol or less, relative to 100 mol of Ti included in at least one of the side margin portions, respectively. Therefore, even when the average thickness te of the internal electrodes 121 and 122 is 0.4 μm or less, reliability of the multilayer electronic component may be secured.

The average thickness te of the internal electrodes 121 and 122 means a size of the internal electrodes 121 and 122 in the first direction. In this case, the average thickness of the internal electrodes 121 and 122 may be measured by scanning cross-sections of the body 110 in the first and second directions with a scanning electron microscope (SEM) at a magnification of 10,000. More specifically, the average thickness of the internal electrodes 121 and 122 may be acquired by measuring thicknesses at a plurality of points of one internal electrode 121 or 122, for example, at thirty points being located at equal intervals in the second direction. The thirty points at equal intervals may be determined on a capacitance formation portion Ac to be described later. In addition, when in a case in which the measurement of an average value is executed with respect to 10 internal electrodes 121 and 122, the average thickness of the internal electrodes 121 and 122 may be more generalized. Other methods and/or tools appreciated by one of ordinary skill in the art, even if not described in the present disclosure, may also be used.

The body 110 may include a capacitance formation portion Ac disposed in the body 110 and including the first and second internal electrodes 121 and 122 alternately disposed with the dielectric layer 111 interposed therebetween to form capacitance, and a first cover portion 112 and a second cover portion 113, respectively disposed on opposite surfaces of the capacitance formation portion Ac in the first direction. The cover portions 112 and 113 may basically play a role in preventing damage to the internal electrodes due to physical or chemical stress. The cover portions 112 and 113 may have the same structure as the dielectric layer 111, except that they do not include an internal electrode.

Average thicknesses tc of the cover portions 112 and 113 do not need to be particularly limited. The average thickness tc of the cover portions 112 and 113 may be 20 μm or less to reduce a size and increase capacitance of the multilayer electronic component. As described above, In a multilayer electronic component according to an embodiment of the present disclosure, an amount of Zn and an amount of Zr in at least one of the side margin portions 141 and 142 satisfy 0.5 mol or more and 1.0 mol or less, relative to 100 mol of Ti included in at least one of the side margin portions, respectively. Therefore, even when the average thickness of the cover portions 112 and 113 is 20 μm or less, reliability of the multilayer electronic component may be secured.

In this case, the average thickness of the cover portions 112 and 113 means an average thickness of the first cover portion 112 and an average thickness of the second cover portion 113, respectively. In addition, the average thickness of the cover portions 112 and 113 may refer to the average size of the cover portions 112 and 113 in the first direction, and may be an average value of sizes in the first direction, measured at five equally spaced points in a plane of the body 110 in the first and second directions.

According to an embodiment of the present disclosure, the side margin portions 141 and 142 disposed on the fifth and sixth surfaces may be included. Specifically, the side margin portions 141 and 142 may include a first side margin portion 141 disposed on the fifth surface, and a second side margin portion 142 disposed on the sixth surface. The side margin portions 141 and 142 may include a plurality of dielectric grains 141a, and a grain boundary 141b disposed between adjacent dielectric grains, and the side margin portions may basically play a role in preventing damage to the internal electrodes 121 and 122 due to physical or chemical stress.

At least one of the side margin portions 141 and 142 may include BaTiO$_3$, Zn, and Zr. The side margin portions 141 and 142 may include BaTiO$_3$ as a main component, Zn may exist as Zno, which is an oxide form of Zn, and Zr may exist as ZrO$_2$, which is an oxide form of Zr, but the present disclosure is not limited thereto.

BaTiO$_3$ may be a representative perovskite oxide having a structure represented by ABO$_3$. Since a Zn ion has a valence of +2, it may be considered that the Zn ion is substituted at a Ba site having a valence of +2, i.e., an A site. In this case, because of a mismatch in size between Ba having a relative large ion size and Zn, solid dissolution limitation may be very low. In addition, it may be considered that the Zn ion is substituted into the B site in the ABO$_3$ structure due to a relative small size thereof. In this case, Zn may have a lower valence than Ti, and may be thus difficult to actually be dissolved into the B site. Therefore, most of Zn may not be dissolved into the dielectric grains 141a of the side margin portions, and may be segregated at the grain boundary 141b of the side margin portions. Zn segregated on the grain boundary in this manner may induce a drag effect that hinders movement of the grain boundary during grain growth of the dielectric grain, and thus may play a role in suppressing the grain growth of the dielectric grains included in the side margin portions. In addition, a Zn oxide may be known as a representative low-temperature sintering aid because of a low melting point thereof. Such a Zn oxide may induce liquid phase sintering of the side margin portions 141 and 142 during sintering, to improve densities of the side margin portions.

In addition, the Zr ion may have a +4 valent ion, in a similar manner to Ti, but may be difficult to be dissolved into the B site due to a large difference in ion size. Therefore, most of the Zr may not be dissolved into the dielectric grains 141a of the side margin portion, but may be segregated at the grain boundary 141b of the side margin portion, and the Zr segregated at the grain boundary may suppress grain growth of the dielectric grain included in the side margin portion, and may improve density of the side margin portion.

In this case, occurrence of a breakdown in withstand voltage at ends of the side margin portions 141 and 142 may be prevented by grain growth suppressing and densification effects of the dielectric grains included in the side margin portions 141 and 142, to improve reliability of the multilayer electronic component.

In addition, even when sintered at a low temperature, densities of the side margin portions 141 and 142 may be improved. Due to this low temperature sintering effect, a density of a boundary region between the capacitance formation portion Ac and the side margin portions 141 and 142 may be improved to lower DF and an effective capacitance change rate of the multilayer electronic component.

According to an embodiment of the present disclosure, an amount of Zn and an amount of Zr in at least one of the side margin portions 141 and 142 may be 0.5 mol or more and 1.0 mol or less, respectively, relative to 100 mol of Ti included in at least one of the side margin portions 141 and 142. When the amount of Zn and the amount of Zr included in at least one of the side margin portions 141 and 142 are less than 0.5 mol, relative to 100 mol of Ti included in at least one of the side margin portions 141 and 142, respectively, a grain growth suppressing effect of the dielectric grains 141a of the side margin portion due to Zn and Zr may be reduced, and an effect of improving reliability of the multilayer electronic component may be insignificant. In addition, when the amount of Zn and the amount of Zr included in at least one of the side margin portions 141 and 142 are greater than 1.0 mol, relative to 100 mol of Ti included in at least one of the side margin portions 141 and 142, respectively, grain growth of the dielectric grains 141a of at least one of the side margin portions 141 and 142 may be excessively suppressed, a density of the side margin portion may be lowered, and external moisture may penetrate through a pore formed in the side margin portion, to reduce reliability of the multilayer electronic component.

For example, the side margin portions 141 and 142 may be formed by stacking dielectric sheets including $BaTiO_3$, Zno, and $Zro_2$ on the fifth and sixth surfaces of the body and then sintering them. In addition, an amount of Zn and an amount of Zr in the side margin portions may be determined by adjusting an amount of ZnO and an amount of $Zro_2$, added to the dielectric sheets.

According to an embodiment of the present disclosure, an amount of Zn in at least one of the side margin portions 141 and 142 may be different from an amount of Zn in the dielectric layer 111, and an amount of Zr in at least one of the side margin portions 141 and 142 may be different from an amount of Zr in the dielectric layer 111.

For example, Zn and Zr included in the side margin portions 141 and 142 may be added to prevent a breakdown in withstand voltage occurring at ends of the side margin portions 141 and 142, and Zn and Zr, having the same amount, need not be added to the dielectric layer 111. In addition, according to an embodiment of the present disclosure, the side margin portions 141 and 142 may be formed by stacking and sintering separate dielectric sheets on the fifth and sixth surfaces of the body. Therefore, the amount of Zn and the amount of Zr included in the side margin portions 141 and 142 and the amount of Zn and the amount of Zr included in the dielectric layer 111 may be adjusted to be different from each other, without a additional process.

For example, the dielectric layer 111 may not include Zn or may include a smaller amount of Zn than at least one of the side margin portions 141 and 142. In addition, the dielectric layer 111 may not include Zr or may include a smaller amount of Zr than at least one of the side margin portions 141 and 142. As described above, there may be problems that Zn and Zr play a role of suppressing grain growth of dielectric grains, and as sizes of dielectric grains in the dielectric layer decreases, effective capacitance of the multilayer electronic component decreases. Therefore, the dielectric layer 111 may not include Zn and Zr, or may include smaller amounts of Zn and Zr than at least one of the side margin portions 141 and 142, to prevent a deterioration in effective capacitance of the multilayer electronic component, while the amount of Zn and the amount of Zr included in at least one of the side margin portions 141 and 142 satisfy 0.5 mol or more and 1.0 mol or less, relative to 100 mol of Ti included in at least one of the side margin portions 141 and 142, respectively, to further improve reliability of the multilayer electronic component.

In an embodiment, an amount of Zn at the grain boundary 141b of the side margin portion may be larger than an amount of Zn in the dielectric grain 141a, and an amount of Zr at the grain boundary 141b of the side margin portion may be larger than an amount of Zr in the dielectric grain 141a. As described above, most of the Zn and Zr included in the side margin portions may not be dissolved into the dielectric grains 141a of the side margin portions, but may be segregated at the grain boundary 141b of the side margin portions, to induce suppression in grain growth and densification. Therefore, the amounts of Zn and Zr in the grain boundary 141b of the side margin portion may be greater than the amounts of Zn and Zr in the dielectric grain 141a, respectively.

In an embodiment, a multilayer electronic component may satisfy 104 nm≤A1≤192 nm, where A1 is an average size of a dielectric grain 141a included in at least one of the side margin portions 141 and 142. In addition, the multilayer electronic component may satisfy 0.34≤A1/A2≤0.65, where A2 is an average size of a dielectric grain 111a included in the dielectric layer 111.

The A1 and A2 may be controlled by, for example, an amount of Zn and an amount of Zr included in the side margin portions and the dielectric layer, respectively. In this case, when A1 and A1/A2 satisfy the above conditions, an effect of improving reliability of the multilayer electronic component by suppression of grain growth in the side margin portion may be more remarkable.

The A1 may mean an average value of sizes of dielectric grains, acquired by obtaining an image from a central region (e.g., portion "K1" in FIG. 4) of the side margin portions 141 and 142 with a scanning electron microscope (SEM) at a magnification of 50,000, in a plane of the multilayer electronic component in the first and third directions, cut in a center in the second direction, and then analyzing the image using an image analysis program, for example, Zootos Program by Zootos. Other methods and/or tools appreciated by one of ordinary skill in the art, even if not described in the present disclosure, may also be used.

In addition, the A2 may mean an average value of sizes of dielectric grains, acquired by obtaining an image from a central region (e.g., portion "K2" in FIG. 4) of the dielectric layer 111 with a scanning electron microscope (SEM) at a magnification of 50,000, in a plane of the multilayer electronic component in the first and third directions, cut at a center in the second direction, and then analyzing the image using an image analysis program, for example, Zootos Program by Zootos. Other methods and/or tools appreciated by one of ordinary skill in the art, even if not described in the present disclosure, may also be used.

In an embodiment, at least one of the side margin portions 141 and 142 may contain Dy, and an amount of Dy in at least one of the side margin portions may be 0.5 mol or more and 2.0 mol or less, relative to 100 mol of Ti included in at least one of the side margin portions. The Dy may exist as an oxide or a carbonate of Dy in the side margin portions 141 and 142, but the present disclosure is not limited thereto. The Dy may serve to improve reliability of the multilayer electronic component.

When the amount of Dy in at least one of the side margin portions is less than 0.5 mol, relative to 100 mol of Ti included in at least one of the side margin portions, the aforementioned reliability improvement effect may be insignificant. In addition, when the amount of Dy in at least one of the side margin portions is larger than 2.0 mol, relative to 100 mol of Ti included in at least one of the side margin portions, high-temperature withstand voltage characteristics of the multilayer electronic component may be deteriorated.

In an embodiment, at least one of the side margin portions 141 and 142 may contain Tb, and an amount of Tb in at least one of the side margin portions may be 0.1 mol or more and 0.5 mol or less, relative to 100 mol of Ti included in at least one of the side margin portions. The Tb may exist as an oxide or a carbonate of Tb in the side margin portions 141 and 142, but the present disclosure is not limited thereto. The Tb may serve to improve reliability of the multilayer electronic component by filling pores generated between the side margin portions 141 and 142 and the internal electrodes 121 and 122.

When the amount of Tb in at least one of the side margin portions is less than 0.1 mol, relative to 100 mol of Ti included in at least one of the side margin portions, the aforementioned reliability improvement effect may be insignificant. In addition, when the amount of Tb in at least one of the side margin portions is greater than 0.5 mol, relative to 100 mol of Ti included in at least one of the side margin portions, a decrease in insulation resistance of the dielectric layer 111 may occur.

In an embodiment, at least one of the side margin portions 141 and 142 may contain Si, and an amount of Si in at least one of the side margin portions may be 2.0 mol or more and 5.0 mol or less, relative to 100 mol of Ti included in at least one of the side margin portions. The Si may exist as an oxide or a carbonate of glass or Si in the side margin portions 141 and 142, but the present disclosure is not limited thereto. The Si may serve to improve high-temperature withstand voltage characteristics of multilayer electronic components.

When the amount of Si in at least one of the side margin portions is less than 2.0 mol, relative to 100 mol of Ti included in at least one of the side margin portions, the above-described high-temperature withstand voltage characteristic improvement effect may be insignificant. In addition, when the amount of Si in at least one of the side margin portions is greater than 5.0 mol, relative to 100 mol of Ti included in at least one of the side margin portions, a problem such as deterioration in sinterability and density of the side margin portion, formation of a secondary phase, or the like may occur.

In an embodiment, at least one of the side margin portions 141 and 142 may contain Al, and an amount of Al in at least one of the side margin portions may be 0.6 mol or less, relative to 100 mol of Ti included in at least one of the side margin portions. The Al may exist as an oxide or a carbonate of glass or Al in the side margin portions 141 and 142, but the present disclosure is not limited thereto. The Al may serve to improve high-temperature withstand voltage characteristics of the multilayer electronic component, and may also serve to improve reliability by acting as an acceptor to reduce an electron concentration.

When the amount of Al in at least one of the side margin portions exceeds 0.6 mol, relative to 100 mol of Ti included in at least one of the side margin portions, a problem such as deterioration in sinterability and density of the side margin portion, formation of a secondary phase, or the like may occur. A lower limit of the amount of Al in at least one of the side margin portions does not need to be particularly limited, and may be, for example, greater than 0 mol.

In an embodiment, at least one of the side margin portions 141 and 142 may contain Mg, and an amount of Mg in at least one of the side margin portions may be 1.0 mol or less, relative to 100 mol of Ti included in at least one of the side margin portions. The Mg may exist as an oxide or a carbonate of Mg in the side margin portions 141 and 142, but the present disclosure is not limited thereto. The Mg may be a valence-fixed acceptor element and may improve reliability of the multilayer electronic component due to n-type formation by acting as a valence-fixed acceptor to reduce an electron concentration.

When the amount of Mg in at least one of the side margin portions is greater than 1.0 mol, relative to 100 mol of Ti included in at least one of the side margin portions, a problem in that a breakdown voltage (BDV) is lowered may occur. A lower limit of the amount of Mg in at least one of the side margin portions does not need to be particularly limited, and may be, for example, greater than 0 mol.

An example of a method of measuring an amount of each element in the dielectric layer 111 and an amount of the side margin portions 141 and 142 will be described. In a non-destructive method, components in dielectric grains of a dielectric layer 111 and side margin portions 141 and 142 may be analyzed using transmission electron microscope-energy dispersive X-ray spectroscopy (TEM-EDS). For example, thinly sliced analysis samples may be prepared using a focused ion beam (FIB) device, in a plane of a multilayer electronic component in the first and third directions, cut at a center in the second direction. Then, a damaged layer on a surface of the thinly sliced sample may be removed using Ar ion milling, and then mapping and quantitative analysis of each component may be performed in an image acquired using TEM-EDS or STEM-EDX. In this case, a graph for the quantitative analysis of each component may be obtained from a mass fraction of each element, and may also be expressed by converting the same into a molar fraction thereof. In addition, in a destructive method, a multilayer electronic component may be disassembled, internal electrodes may be removed, side margin portions and dielectric layers may be selected, and components of the side margin portions and dielectric layers, thus selected, may be analyzed using an apparatus such as a inductively coupled plasma spectrometry (ICP-OES), inductively coupled plasma mass spectrometer (ICP-MS), or the like. However, the present disclosure is not limited thereto, and an amount of each element in the dielectric layer 111 and the side margin portions 141 and 142 may be measured by various analysis methods such as X-ray fluorescence spectrometry (XRF) or the like. Other methods and/or tools appreciated by one of ordinary skill in the art, even if not described in the present disclosure, may also be used.

In an embodiment, an average thickness of the side margin portions 141 and 142 may be 2 μm to 10 μm. When the average thickness of the side margin portions 141 and 142 is less than 2 μm, reliability of the multilayer electronic component may be deteriorated, and when the average thickness of the side margin portions 141 and 142 exceeds 10 μm, capacitance per unit volume of the multilayer electronic component may be lowered.

In this case, the average thickness of the side margin portions 141 and 142 may mean an average thickness of the first side margin portion 141 and an average thickness of the second side margin portion 142, respectively. In addition, the average thickness of the side margin portions 141 and 142 may mean an average size of the side margin portions 141 and 142 in the third direction, and may be an average size in the first direction, measured at five equally spaced points in a plane of the multilayer electronic component in the first and third directions The external electrodes 131 and 132 may be disposed on the third and fourth surfaces 3 and 4 of the body 110, and may extend onto portions of the first, second, fifth and sixth surfaces. In addition, the external electrodes 131 and 132 may include a first external electrode 131 connected to the plurality of first internal electrodes 121, and a second external electrode 132 connected to the plurality of second internal electrodes 122.

The external electrodes 131 and 132 may be formed by dipping the third and fourth surfaces 3 and 4 of the body 110 in a conductive paste for external electrodes containing a conductive metal and glass, and then sintering them, and may be formed by transferring a sheet including a conductive metal and glass.

The conductive metal included in the external electrodes 131 and 132 may be copper (Cu), nickel (Ni), palladium (Pd), platinum (Pt), gold (Au), silver (Ag), lead (Pb), an alloy including the same, and/or the like, but the present disclosure is not limited thereto.

In addition, although not illustrated, a plating layer for improving mounting characteristics may be disposed on the external electrodes 131 and 132. The plating layer may be a plating layer including nickel (Ni), tin (Sn), palladium (Pd), an alloy including the same, and/or the like, or may be formed as a plurality of layers. In addition, the plating layer may be a nickel (Ni) plating layer or a tin (Sn) plating layer, or may have a configuration in which a nickel (Ni) plating layer and a tin (Sn) plating layer are sequentially formed.

In the drawings, a structure in which the multilayer electronic component 100 has two external electrodes 131 and 132 is illustrated, but is not limited thereto, and the number or shapes of the external electrodes 131 and 132 may be determined by the internal electrodes 121 and 122, or other purposes.

Experimental Example

First, after preparing a body including a dielectric layer and an internal electrode, a dielectric sheet including BaTiO$_3$, ZnO, Zro$_2$, an additive, a solvent, a dispersant, and the like was separately prepared, and the dielectric sheet was placed on fifth and sixth surfaces of the body. Thereafter, they were sintered to prepare margin portions. After the sintering, third and fourth surfaces of the body were dipped into a conductive paste for external electrodes, containing Cu, and then sintered to form external electrodes, to prepare sample chips. Zn and Zr were not separately added to the dielectric layer of each of the sample chips.

In this case, for ten samples per each test number, an amount of Zn, relative to 100 mol of Ti included in the side margin portions, and an amount of Zr, relative to 100 mol of Ti included in the side margin portions, were measured, respectively, and an average value of amounts of Zn and an average value of amounts of Zr were illustrated in Table 1 below.

In addition, images of a central region of the side margin portions with a scanning electron microscope (SEM) at a magnification of 50,000, in a plane of the sample chips in the first and third directions, cut at a center in the second direction, were obtained, the images were analyzed using Zootos Program of Zootos to determine an average size A1 of dielectric grains included in the side margin portion, and results therefrom were then listed in Table 1 below.

In the same plane, images of a dielectric layer disposed in a central region of a capacitance forming portion Ac were obtained with a scanning electron microscope (SEM) at a magnification of 50,000, then the images were analyzed using Zootos Program of Zootos to determine an average size A2 of dielectric grains included in the dielectric layer, and results therefrom were then listed in Table 1 below.

TABLE 1

| Test No. | Zn Amount (mol) | Zr Amount (mol) | A1 (nm) | A1/A2 |
|---|---|---|---|---|
| 1 | 0 | 0 | 303 | 0.98 |
| 2 | 0.1 | 0.1 | 291 | 0.96 |
| 3 | 0.5 | 0.5 | 192 | 0.65 |
| 4 | 1.0 | 1.0 | 104 | 0.34 |
| 5 | 1.5 | 1.5 | 96 | 0.33 |

Referring to Table 1, it can be seen that, as an amount of Zn and an amount of Zr in the side margin portions increase, grain growth of dielectric grains of the side margin portions was suppressed to reduce A1, and accordingly, A1/A2 values also decreased.

Figure 7A:
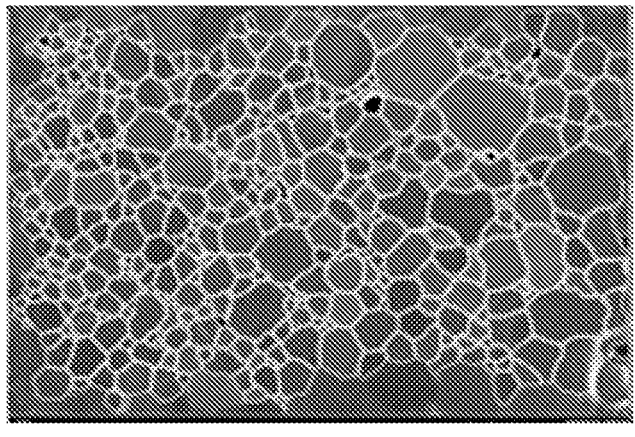
FIGS. 7A to 9 are images of side margin portions of each test number, taken with a scanning electron microscope (SEM).
Figure 7B:
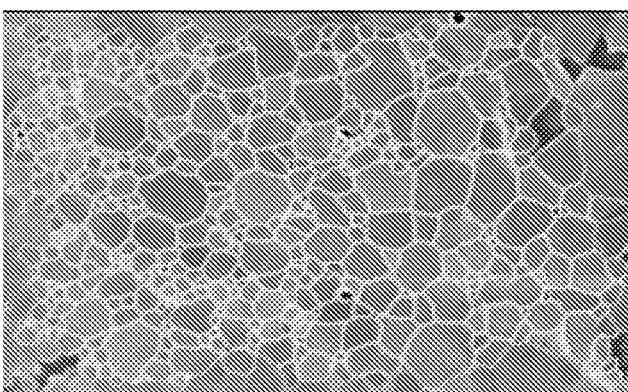
Figure 8A:
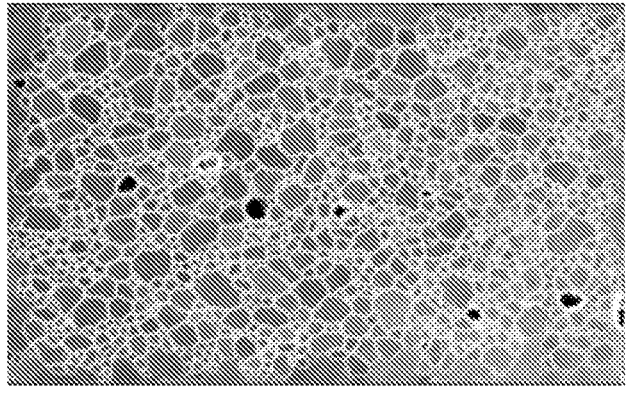
Figure 8B:
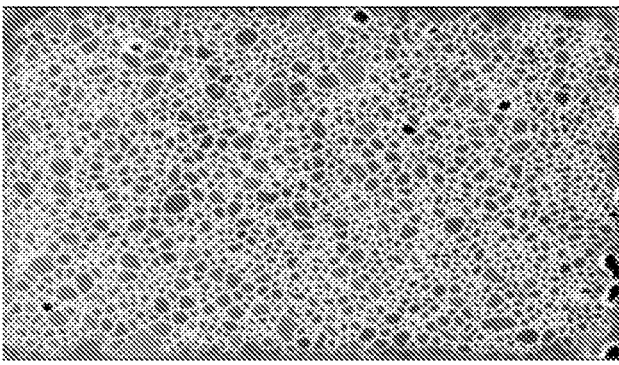
Figure 9:
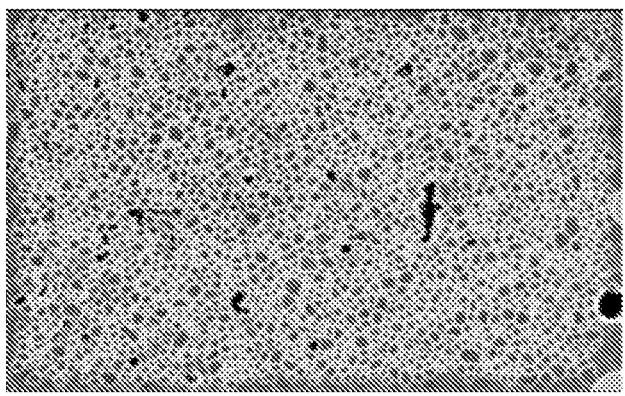

FIGS. 7A to 9 are images taken with a scanning electron microscope (SEM) of the side margin portions of each test number. More specifically, FIG. 7A is an image of a side margin portion of test number 1, FIG. 7B is an image of a side margin portion of test number 2, FIG. 8A is an image of a side margin portion of test number 3, FIG. 8B is an image of a side margin portion of test number 4, and FIG. 9 is an image of a side margin portion of test number 5, taken with a scanning electron microscope (SEM). Referring to FIGS. 7A to 9, it can be seen that, as an amount of Zn and an amount of Zr in the side margin portions increases, an average size of dielectric grains of the side margin portions decreased.

Next, dielectric loss (a dissipation factor, DF) and effective capacitance change rate at 1V DC were measured under conditions of 100 kHz, 0.01 Vrms, 1 Vdc, and measurement time of 60 seconds, and were listed in Table 2 below. In addition, high-temperature reliability evaluation and moisture resistance evaluation were performed on forty sample chips for each test number.

In the high-temperature reliability evaluation, each sample chip was mounted, a voltage of 12.6 V was applied for 50 hours at a temperature of 105° C., and then the number of samples of which insulation resistance value fell 6 order or below was illustrated in Table 2 below.

In the moisture resistance reliability evaluation, each sample chip was mounted, a voltage of 12.6 V was applied for 24 hours at a temperature of 85° C. and a relative humidity of 85%, the number of samples of which insulation resistance value fell 1 order or more than an initial value was illustrated in Table 2 below.

TABLE 2

| Test No. | DF (%) | Effective Capacitance Change Rate (%) | High Temperature Reliability | Moisture Resistance Reliability |
|---|---|---|---|---|
| 1 | 5.31 | −13.7 | 3/40 | 2/40 |
| 2 | 5.26 | −12.9 | 1/40 | 0/40 |
| 3 | 4.90 | −12.4 | 0/40 | 0/40 |
| 4 | 4.89 | −12.1 | 0/40 | 0/40 |
| 5 | 4.81 | −11.9 | 1/40 | 1/40 |

Referring to Table 2, it can be seen that, as an amount of Zn and an amount of Zr in the side margin portions increase, DF and effective capacitance change rate decreased. It can be expected that density between the capacitance forming portion, the side margin portions increase, and a boundary region was improved due to Zn and Zr included in the side margin portion, and the DF and effective capacitance change rate of the sample chips were reduced.

In Test Nos. 1 and 2, samples that were defective in the high-temperature reliability evaluation and/or the moisture resistance evaluation occurred. It can be expected because the amounts of Zn and Zr included in the side margin portions were small, and an effect of improving reliability due to Zn and Zr was insignificant. In addition, it can be expected because a reason for occurrence of defective samples in the high-temperature reliability evaluation and the moisture resistance evaluation in Test No. 5 was that external moisture penetrates through pores generated by excessive suppression of grain growth, as illustrated in FIG. 9.

In Test Nos. 3 and 4, no sample that was defective in both the high-temperature reliability evaluation and the moisture resistance evaluation. Therefore, when the amount of Zn and the amount of Zr in at least one of the side margin portions were 0.5 mol or more 1.0 mol or less, relative to 100 mol of Ti included in at least one of the side margin portions, respectively, an effect of improving reliability of the multilayer electronic component was remarkable.

The present disclosure is not limited by the above-described embodiments and accompanying drawings, but is intended to be limited by the appended claims. Therefore, various forms of substitution, modification, and change will be possible by those skilled in the art within the scope of the technical spirit of the present disclosure described in the claims, and this will also be said to fall within the scope of the present disclosure.

In addition, the expression 'an embodiment' does not indicate the same embodiment, and is provided to emphasize and describe different unique characteristics. However, an embodiment presented above is not excluded from being implemented in combination with features of another embodiment. For example, even if a matter described in one detailed embodiment is not described in another embodiment, and it can be understood as a description related to another embodiment, unless there is a description contradicting or contradicting the matter in another embodiment.

In addition, expressions such as first and second are used to distinguish one component from another, and do not limit the order and/or importance of the components. In some cases, without departing from the scope of rights, a first element may be named a second element, and similarly, a second element may be named a first element.

As one of various effects of the present disclosure, reliability of a multilayer electronic component may be improved.

As one of various effects of the present disclosure, a dissipation factor (DF) and an effective capacitance change rate of a multilayer electronic component may be reduced.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes alternately disposed in a first direction with the dielectric layer interposed therebetween, and having first and second surfaces opposing each other in the first direction, third and fourth surfaces opposing each other in a second direction and connected to the first and second surfaces, and fifth and sixth surfaces opposing each other in a third direction and connected to the first to fourth surfaces;
side margin portions disposed on the fifth and sixth surfaces; and
external electrodes disposed on the third and fourth surfaces,
wherein at least one of the side margin portions includes $BaTiO_3$, Zn, and Zr,
an amount of Zn and an amount of Zr in the at least one of the side margin portions are 0.5 mol or more and 1.0 mol or less, relative to 100 mol of Ti included in the at least one of the side margin portions, respectively, and
the amount of Zn in the at least one of the side margin portions is different from an amount of Zn in the dielectric layer, and the amount of Zr in the at least one of the side margin portions is different from an amount of Zr in the dielectric layer, and
wherein the at least one of the side margin portions comprises a plurality of dielectric grains and grain boundaries, and an amount of Zn and an amount of Zr at the grain boundaries are higher than in the dielectric grains.

2. The multilayer electronic component of claim 1, wherein the dielectric layer does not include Zn or includes a smaller amount of Zn than the at least one of the side margin portions.

3. The multilayer electronic component of claim 1, wherein the dielectric layer does not include Zr or includes a smaller amount of Zr than the at least one of the side margin portions.

4. The multilayer electronic component of claim 1, satisfying 104 nm≤A1≤192 nm, where A1 is an average size of a dielectric grain included in the at least one of the side margin portions.

5. The multilayer electronic component of claim 1, satisfying 0.34≤A1/A2≤0.65, where A1 is an average size of a dielectric grain included in the at least one of the side margin portions, and A2 is an average size of a dielectric grain included in the dielectric layer.

6. The multilayer electronic component of claim 1, wherein the at least one of the side margin portions further includes Dy, and
wherein an amount of Dy in the at least one of the side margin portions is 0.5 mol or more and 2.0 mol or less, relative to 100 mol of Ti included in the at least one of the side margin portions.

7. The multilayer electronic component of claim 1, wherein the at least one of the side margin portions further includes Tb, and wherein an amount of Tb in the at least one of the side margin portions is 0.1 mol or more and 0.5 mol or less, relative to 100 mol of Ti included in the at least one of the side margin portions.

8. The multilayer electronic component of claim 1, wherein the at least one of the side margin portions further includes Si, and wherein an amount of Si in the at least one of the side margin portions is 2.0 mol or more and 5.0 mol or less, relative to 100 mol of Ti included in the at least one of the side margin portions.

9. The multilayer electronic component of claim 1, wherein the at least one of the side margin portions further includes A1, and wherein an amount of A1 in the at least one of the side margin portions is 0.6 mol or less, relative to 100 mol of Ti included in the at least one of the side margin portions.

10. The multilayer electronic component of claim 1, wherein the at least one of the side margin portions further includes Mg, and wherein an amount of Mg in the at least one of the side margin portions is 1.0 mol or less, relative to 100 mol of Ti included in the at least one of the side margin portions.

11. The multilayer electronic component of claim 1, wherein the first internal electrode is connected to the third, fifth, and sixth surfaces, and the second internal electrode is connected to the fourth, fifth, and sixth surfaces.

12. A multilayer electronic component comprising:

a body including a dielectric layer and first and second internal electrodes alternately disposed in a first direction with the dielectric layer interposed therebetween, and having first and second surfaces opposing each other in the first direction, third and fourth surfaces opposing each other in a second direction and connected to the first and second surfaces, and fifth and sixth surfaces opposing each other in a third direction and connected to the first to fourth surfaces;

side margin portions disposed on the fifth and sixth surfaces; and external electrodes disposed on the third and fourth surfaces, wherein at least one of the side margin portions includes $BaTiO_3$, Zn, and Zr, an amount of Zn in the at least one of the side margin portions is more than an amount of Zn in the dielectric layer, and an amount of Zr in the at least one of the side margin portions is more than an amount of Zr in the dielectric layer, and wherein the at least one of the side margin portions comprises a plurality of dielectric grains and grain boundaries, and an amount of Zn and an amount of Zr at the grain boundaries are higher than in the dielectric grains.

13. The multilayer electronic component of claim 12, wherein the amour of Zn and the amount of Zr in the at least one of the side margin portions are 0.5 mol or more and 1.0 mol or less, relative to 100 mol of Ti included in the at least one of the side margin portions, respectively.

14. The multilayer electronic component of claim 12, wherein the dielectric layer is free of Zn.

15. The multilayer electronic component of claim 12, wherein the dielectric layer is free of Zr.

* * * * *